US012621085B2

(12) United States Patent
Zhang et al.

(10) Patent No.: US 12,621,085 B2
(45) Date of Patent: May 5, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 353 days.

(21) Appl. No.: 18/366,552

(22) Filed: Aug. 7, 2023

(65) Prior Publication Data

US 2024/0007231 A1     Jan. 4, 2024

Related U.S. Application Data

(63) Continuation     of     application     No. PCT/CN2021/085353, filed on Apr. 2, 2021.

(51) Int. Cl.
H04L 1/1822          (2023.01)
H04L 1/1829          (2023.01)
H04W 72/21          (2023.01)

(52) U.S. Cl.
CPC .......... H04L 1/1822 (2013.01); H04L 1/1861 (2013.01); H04W 72/21 (2023.01)

(58) Field of Classification Search
CPC ... H04L 1/1822; H04L 1/1861; H04L 1/1854; H04W 72/21; H04W 72/563
(Continued)

(56) References Cited

U.S. PATENT DOCUMENTS

2019/0260515 A1*   8/2019   Tang ......................... H04L 5/00
2020/0106566 A1*   4/2020   Yeo ....................... H04L 1/1812
(Continued)

FOREIGN PATENT DOCUMENTS

CN          110945815          3/2020
CN          112398631          2/2021

OTHER PUBLICATIONS

ZTE, "Discussion on mechanisms to Improve Reliability for RRC_CONNECTED UEs," 3GPP TSG RAN WG1 #104b-e, R1-2102502, Apr. 2021.
(Continued)

*Primary Examiner* — Don N Vo
(74) *Attorney, Agent, or Firm* — Hodgson Russ LLP

(57)          ABSTRACT

Disclosed are a wireless communication method and a terminal device. In the case of simultaneous presence of HARQ feedback for unicast and HARQ feedback for MBS, the HARQ feedback for the unicast and the HARQ feedback for the MBS may be transmitted on the basis of PUCCH resources having different priorities. The wireless communication method comprises: a terminal device determines, according to a first corresponding relationship, a PUCCH configuration for transmitting at least one hybrid automatic repeat request (HARQ) codebook, wherein the first corresponding relationship comprises a corresponding relationship between the PUCCH configuration and the HARQ codebook and determined on the basis of priority information, and the HARQ codebook in the at least one HARQ codebook comprises HARQ feedback information for the unicast and/or HARQ feedback information for the MBS.

18 Claims, 2 Drawing Sheets

<u>300</u>

A terminal device determines, according to a first corresponding relationship, a PUCCH configuration for transmitting at least one HARQ codebook, wherein the first corresponding relationship comprises a corresponding relationship between the PUCCH configuration and the HARQ codebook determined on the basis of priority information, and the HARQ codebook in the at least one HARQ codebook comprises HARQ feedback information for the unicast and/or HARQ feedback information for the MBS

S301

(58) Field of Classification Search
USPC ....................................................... 455/414.1
See application file for complete search history.

(56) References Cited

U.S. PATENT DOCUMENTS

| | | | | |
|---|---|---|---|---|
| 2021/0006318 | A1 | 1/2021 | Kim et al. | |
| 2021/0014647 | A1 | 1/2021 | Takeda et al. | |
| 2021/0194637 | A1* | 6/2021 | Lin ....................... | H04L 1/1812 |
| 2022/0094482 | A1* | 3/2022 | Wu ....................... | H04W 72/23 |
| 2022/0377717 | A1* | 11/2022 | Park ..................... | H04L 1/1896 |

OTHER PUBLICATIONS

WIPO, International Search Report and Written Opinion for PCT/CN2021/085353, Dec. 22, 2021.
"RAN1 Chairman's Notes," 3GPP TSG RAN WG1 Meeting #103-e, Oct. 2020.
"3rd Generation Partnership Project; Technical Specification Group Radio Access Network; NR; Physical channels and modulation (Release 16)," 3GPP TS 38.211, Sep. 2020, v16.3.0.
"3rd Generation Partnership Project; Technical Specification Group Radio Access Network; NR; Radio Resource Control (RRC) protocol specification (Release 16)," 3GPP TS 38.331, Sep. 2020, v16.2.0.
"3rd Generation Partnership Project; Technical Specification Group Radio Access Network; NR; Physical layer procedures for control (Release 16)," 3GPP TS 38.213, Sep. 2020, v16.3.0.
EPO, Communication for EP Application No. 21934093.2, Dec. 17, 2024.
Intel Corporation, "Mechanisms to Improve Reliability of NR MBS for RRC_CONNECTED UEs," 3GPP TSG RAN WG1 #104-e, R1-2100675, Jan. 2021.
EPO, Extended European Search Report for EP Application No. 21934093.2, Feb. 13, 2024.
EPO, Communication for EP Application No. 21934093.2, Jul. 30, 2025.

* cited by examiner

100

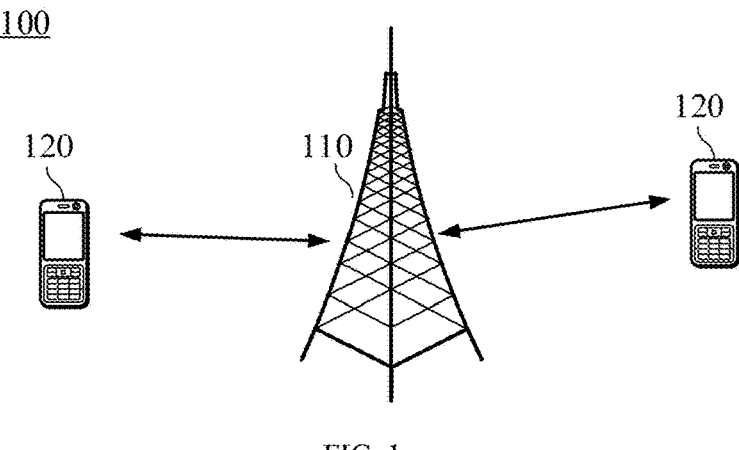

FIG. 1

| 2 bits | N2 bits | N3 bits | 1706 bits |
|---|---|---|---|

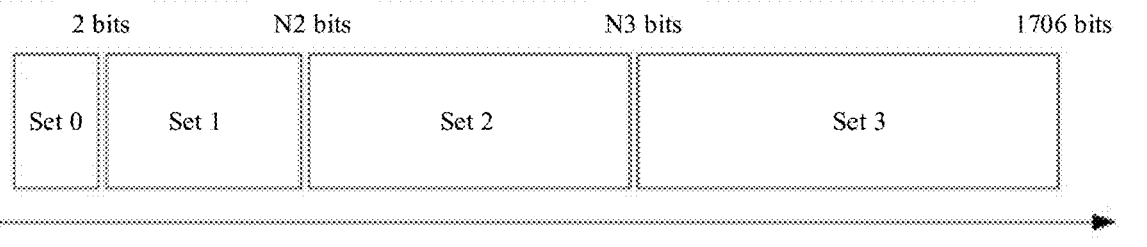

Number of UCI bits

A terminal device determines, according to a first corresponding relationship, a PUCCH configuration for transmitting at least one HARQ codebook, wherein the first corresponding relationship comprises a corresponding relationship between the PUCCH configuration and the HARQ codebook determined on the basis of priority information, and the HARQ codebook in the at least one HARQ codebook comprises HARQ feedback information for the unicast and/or HARQ feedback information for the MBS

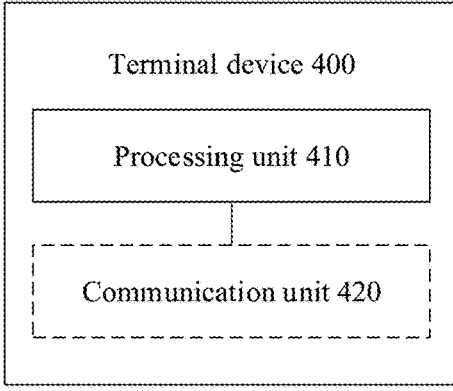

FIG. 4

WIRELESS COMMUNICATION METHOD AND TERMINAL DEVICE

CROSS-REFERENCE TO RELATED APPLICATION

This application is a continuation of International Application No. PCT/CN2021/085353, filed Apr. 2, 2021, the entire disclosure of which is incorporated herein by reference.

TECHNICAL FIELD

The embodiments of the present application relate to the field of communication, and more particularly, to a method of wireless communication and a terminal device.

BACKGROUND

In a New Radio (NR) system, Hybrid Automatic Repeat request (HARQ) feedback for unicast and HARQ feedback for Multicast Broadcast Service (MBS) may exist at the same time. In this case, how to select the PUCCH resource to transmit HARQ feedback information is an urgent problem to be solved.

SUMMARY

The embodiments of the present application provide a method of wireless communication and a terminal device. In the case where HARQ feedback for unicast and HARQ feedback for MBS exist at the same time, the HARQ feedback for unicast and the HARQ feedback for MBS can be transmitted based on the PUCCH resources of different priorities, ensuring the transmission reliability of the HARQ feedback for unicast and the HARQ feedback for MBS.

In a first aspect, a method of wireless communication is provided, the method including:

- determining, by a terminal device, a PUCCH configuration for transmitting at least one HARQ codebook according to a first corresponding relationship;
- where the first corresponding relationship includes a corresponding relationship between the PUCCH configuration and the HARQ codebook determined based on priority information, and the HARQ codebook in the at least one HARQ codebook includes HARQ feedback information for unicast and/or HARQ feedback information for MBS.

In a second aspect, a terminal device is provided for executing the method in the above-mentioned first aspect.

Specifically, the terminal device includes a functional module for executing the method in the first aspect.

In a third aspect, a terminal device is provided, including a processor and a memory. The memory is used to store a computer program, and the processor is used to call and run the computer program stored in the memory to execute the method in the first aspect.

In a fourth aspect, an apparatus is provided for implementing the method in the above-mentioned first aspect.

Specifically, the apparatus includes: a processor for invoking and running a computer program from a memory, so that a device in which the apparatus is installed executes the method in the above-mentioned first aspect.

In a fifth aspect, a computer-readable storage medium is provided for storing a computer program, and the computer program causes a computer to execute the method in the above-mentioned first aspect.

In a sixth aspect, a computer program product is provided, including computer program instructions, the computer program instructions causing a computer to perform the method of the above-mentioned first aspect.

In a seventh aspect, there is provided a computer program which, when run on a computer, causes the computer to perform the method of the above-mentioned first aspect.

Through the above technical solutions, the terminal device can determine the PUCCH configuration for transmitting the HARQ codebook for unicast and/or MBS according to the corresponding relationship between the PUCCH configuration and the HARQ codebook determined based on the priority information. That is, the HARQ feedback for unicast and the HARQ feedback for MBS can be transmitted based on PUCCH resources of different priorities, ensuring the transmission reliability of the HARQ feedback for unicast and the HARQ feedback for MBS.

BRIEF DESCRIPTION OF THE DRAWINGS

FIG. 1 is a schematic diagram of a communication system architecture to which an embodiment of the present application is applied.

FIG. 2 is a schematic diagram of a PUCCH resource set configuration provided by the present application.

FIG. 3 is a schematic flowchart of a method of wireless communication according to an embodiment of the present application.

FIG. 4 shows a schematic block diagram of a terminal device according to an embodiment of the present application.

DETAILED DESCRIPTION

Figure 5:
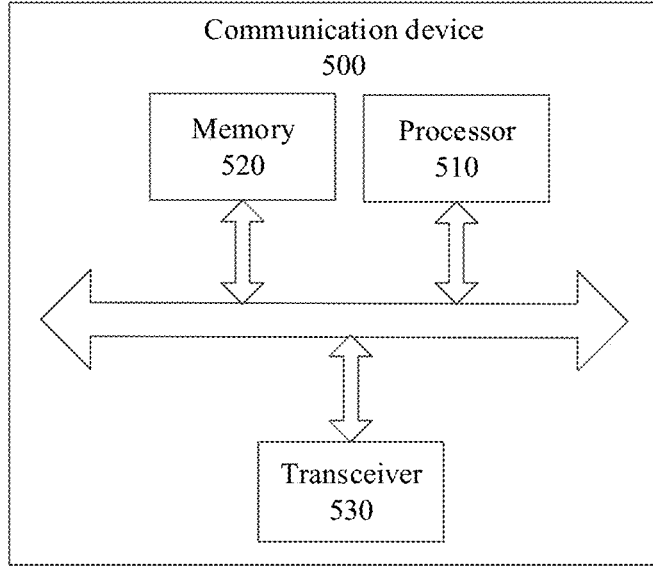
FIG. 5 is a schematic structural diagram of a communication device provided by an embodiment of the present application.

The technical solutions in the embodiments of the present application will be described below with reference to the accompanying drawings in the embodiments of the present application. Obviously, the described embodiments are part of the embodiments of the present application, not all of the embodiments. With regard to the embodiments in the present application, all other embodiments obtained by persons of ordinary skill in the art without creative efforts shall fall within the protection scope of the present application.

The technical solutions of the embodiments of the present application can be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, an NR system, an evolution system of NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), Wireless Local Area Networks (WLAN), Wireless Fidelity (WiFi), the fifth generation communication (5th-Generation, 5G) system or other communication systems, etc.

Generally speaking, traditional communication systems support a limited number of connections, which are easy to be implemented. However, with the development of communication technology, the mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the embodiments of the present application can also be applied to these communication systems.

In some embodiments, the communication system in the embodiments of the present application can be applied to a Carrier Aggregation (CA) scenario, a Dual Connectivity (DC) scenario, and can also be applied to a Standalone (SA) network deployment scenario.

In some embodiments, the communication system in the embodiments of the present application may be applied to an unlicensed spectrum, where the unlicensed spectrum may also be considered as a shared spectrum; or, the communication system in the embodiments of the present application may also be applied to a licensed spectrum, and the licensed spectrum can also be considered as a non-shared spectrum.

The embodiments of the present application describe various embodiments in conjunction with the network device and the terminal device, where the terminal device may also be referred to as User Equipment (UE), an access terminal, a subscriber unit, a subscriber station, a mobile station, a mobile, a remote station, a remote terminal, a mobile device, a user terminal, a terminal, a wireless communication device, a user agent or a user apparatus, etc.

The terminal device may be a station (STATION, ST) in the WLAN, and may be a cellular phone, a cordless phone, a Session Initiation Protocol (SIP) phone, a Wireless Local Loop (WLL) station, a Personal Digital Assistant (PDA) device, a handheld device with wireless communication capabilities, a computing device or other processing devices connected to wireless modems, an in-vehicle device, a wearable device, a next-generation communication system such as a terminal device in the NR network, or a terminal device in the future evolved Public Land Mobile Network (PLMN) network, etc.

In the embodiments of the present application, the terminal device can be deployed on land, including indoor or outdoor, handheld, wearable, or vehicle-mounted; it can also be deployed on water (such as ships, etc.); it can also be deployed in the air (such as airplanes, balloons, and satellites).

In the embodiments of the present application, the terminal device may be a Mobile Phone, a tablet computer (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or a wireless terminal device in smart home, etc.

As an example but not a limitation, in the embodiments of the present application, the terminal device may also be a wearable device. The wearable device may also be referred to as a wearable smart device, which is a general term for wearable devices which are intelligently designed and developed for daily wear by applying wearable technology, such as glasses, gloves, watches, clothing and shoes. The wearable device is a portable device that is worn directly on the body, or integrated into the user's clothing or accessories.

The wearable device is not only a hardware device, but also achieves powerful functions through software support, data interaction, and cloud interaction. Generalized wearable smart devices include full-featured and large-sized devices that can achieve complete or partial functions without relying on smartphones, such as smart watches or smart glasses, and devices that focus only on a certain type of application function and need to be used in conjunction with other devices (e.g., smartphones), such as various types of smart bracelets and smart jewelry for physical sign monitoring.

In the embodiments of the present application, the network device may be a device used to communicate with the mobile device, and the network device may be an Access Point (AP) in WLAN, a base station (Base Transceiver Station, BTS) in GSM or CDMA, or a base station (NodeB, NB) in WCDMA, and may be an Evolutional Node B (eNB or eNodeB) in LTE, or a relay station or an access point, or a vehicle device, a wearable device, and may be a network device (gNB) in the NR network, or a network device in the future evolved PLMN network, or a network device in the NTN network, etc.

As an example but not a limitation, in the embodiments of the present application, the network device may have mobile characteristics, for example, the network device may be a mobile device. In some embodiments, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. In some embodiments, the network device may also be a base station set up on land, water, and other positions.

In the embodiments of the present application, the network device may provide services for the cell, and the terminal device communicates with the network device through the transmission resources (for example, frequency domain resources, or spectrum resources) used by the cell. The cell may be a cell corresponding to a network device (such as a base station), and the cell may belong to a macro base station or a base station corresponding to a small cell, where the small cell may include: a Metro cell, a Micro cell, a Pico cell, a Femto cell, etc. These small cells have the characteristics of small coverage and low transmission power, and are suitable for providing high-speed data transmission services.

Exemplarily, a communication system 100 to which the embodiments of the present application are applied is shown in FIG. 1. The communication system 100 may include a network device 110, and the network device 110 may be a device that communicates with a terminal device 120 (or referred to as a communication terminal, a terminal). The network device 110 may provide communication coverage for a particular geographic area, and may communicate with the terminal device(s) located within the coverage area.

FIG. 1 exemplarily shows one network device and two terminal devices. In some embodiments, the communication system 100 may include a plurality of network devices and the coverage of each network device may include other numbers of terminal devices, which is not limited by the embodiments of the present application.

In some embodiments, the communication system 100 may further include other network entities such as a network controller and a mobility management entity, which are not limited in the embodiments of the present application.

It should be understood that, in the embodiments of the present application, a device having a communication function in the network/system may be referred to as a communication device. Taking the communication system 100 shown in FIG. 1 as an example, the communication device may include a network device 110 and a terminal device 120 with a communication function, and the network device 110 and the terminal device 120 may be the specific devices described above, which will not be repeated here. The communication device may also include other devices in the communication system 100, such as a network controller, a mobility management entity, and other network entities, which are not limited in the embodiments of the present application.

It should be understood that the terms "system" and "network" are often used interchangeably herein. The term "and/or" in the present disclosure is just an association relationship for describing associated objects, which means that there may be three relationships. For example, A and/or B may indicate the following three conditions: A exists alone, A and B exist simultaneously, and B exists alone. In addition, the character "I" in the present disclosure generally indicates that the contextual objects are in an "or" relationship.

The terms used in the embodiments of the present application are only used to explain specific embodiments of the present application, and are not intended to limit the present application. The terms "first", "second", "third" and "fourth" in the description and claims of the present application and the drawings are used to distinguish different objects, rather than to describe a specific order. Furthermore, the terms "include" and "have" and any variations thereof are intended to cover non-exclusive inclusion.

It should be understood that the "indicating" mentioned in the embodiments of the present application may be a direct indication, an indirect indication, or an indication that there is an association relationship. For example, A indicating B may mean that A directly indicates B, for example, B may be obtained through A; it may also indicate that A indirectly indicates B, for example, A indicates C, and B may be obtained through C; it may also indicate that there is an association between A and B.

In the description of the embodiments of the present application, the term "corresponding" may indicate that there is a direct or indirect correspondence between the two, or that there is an association between the two, or may be a relationship of indicating and being indicated, configuring and being configured, etc.

In the embodiments of the present application, "predefinition" may be implemented by pre-saving corresponding codes, forms, or other means that can be used to indicate relevant information in devices (for example, including the terminal device and the network device), and the specific implementation manner thereof is not limited in the present application. For example, predefinition may refer to a definition in the protocol.

In the embodiments of the present application, the "protocol" may refer to a standard protocol in the communication field, for example, it may include the LTE protocol, the NR protocol, and related protocols applied in future communication systems, which are not limited in the present application.

In the 5G network environment, in order to reduce air interface signaling, quickly restore wireless connections, and quickly restore data services, a new Radio Resource Control (RRC) state is defined, namely RRC_INACTIVE (deactivated) state. This state is different from the RRC_IDLE (idle) and RRC_CONNECTED (connected) states. RRC_IDLE: the mobility is UE-based cell selection reselection, paging is initiated by the Core Network (CN), and the paging area is configured by the CN. There is no UE Access Stratum (AS) context on the base station side, nor does an RRC connection exist. RRC_CONNECTED: there is an RRC connection, and the UE AS context exists in the base station and the UE; the network device knows that the location of the UE is at the specific cell level. The mobility is the mobility controlled by the network device. Unicast data can be transmitted between the UE and the base station. RRC_INACTIVE: the mobility is UE-based cell selection reselection, there is a connection between CN-NR, UE AS context exists on a certain base station, paging is triggered by Radio Access Network (RAN), the RAN-based paging area is managed by the RAN, and the network device knows that the location of the UE is based on the paging area level of the RAN.

To facilitate a better understanding of the embodiments of the present application, a Multimedia Broadcast Multicast Service (MBMS) in Long Term Evolution (LTE) related to the present application is described.

MBMS is a service introduced in the 3rd Generation Partnership Project (3GPP), Release (R) 6. Multimedia broadcast multicast service is a technology that transmits data from one data source to a plurality of user devices by sharing the network resource. It can effectively utilize the network resource to realize high-speed (256 kbps) multimedia service broadcast and multicast while providing the multimedia service. MBMS is similar to Multicast Broadcast Service (MBS) hereinafter.

Due to the low spectral efficiency of MBMS in 3GPP R6, it is not enough to effectively carry and support the operation of mobile TV type services. Therefore, in the wireless access network LTE project, 3GPP clearly proposed to enhance the support capability for downlink high-speed multimedia broadcast multicast services, and determined the design requirements for the physical layer and the air interface.

eMBMS was introduced to the LTE network in R9. E-MBMS proposes the concept of Single Frequency Network (SFN), that is, using a uniform frequency to transmit data in all cells at the same time, but it is needed to ensure synchronization between the cells. In this way, the overall signal-to-noise ratio distribution of the cell can be greatly improved, and the spectral efficiency will also be greatly improved accordingly. And based on the Internet Protocol (IP) multicast protocol, business broadcast and multicast are achieved.

In order to facilitate a better understanding of the embodiments of the present application, the Physical Uplink Control Channel (PUCCH) resource in the NR unicast communication related to the present application is described.

In the LTE system, before the introduction of carrier aggregation, the resource of the PUCCH format 1a/1b for transmitting the Acknowledge character (ACK) or Negative Acknowledge character (NACK) corresponding to dynamithe same time. If the PUCCH indication information field in the DCI is 2 bits, that is, each terminal can only have 4 alternative PUCCH resources to transmit 1 or 2 bits ACK/NACK, then the resource conflict problem in the system will be more serious. Therefore, 3 bits are used in the NR DCI to indicate the PUCCH resource. For PUCCH set 0 (carrying 1-2 bits of UCI), a maximum of 32 PUCCH resources can be configured by high-layer signaling. When the number of PUCCH resources is not greater than 8, the PUCCH resource is directly determined according to the indication in the DCI. When the number of PUCCH resources is greater than 8, one PUCCH resource is determined according to the CCE index and the 3-bit indication information in the DCI. The specific method is as follows:

$$
r_{PUCCH} =
\begin{cases}
\left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH}\bmod 8 \\[4mm]
\left\lfloor \dfrac{n_{CCE,p} \cdot \lfloor R_{PUCCH}/8 \rfloor}{N_{CCE,p}} \right\rfloor + \Delta_{PRI} \cdot \left\lfloor \dfrac{R_{PUCCH}}{8} \right\rfloor + R_{PUCCH}\bmod 8 & \text{if } \Delta_{PRI} \geq R_{PUCCH}\bmod 8
\end{cases}
$$

cally scheduling the Physical Downlink Shared Channel (PDSCH) is calculated according to the physical resource unit Control Channel Element (CCE) occupied by the Downlink Control Information (DCI) for scheduling PDSCH transmission. After the introduction of carrier aggregation, the resource of PUCCH formats 3/4/5 for transmitting ACK/NACK information corresponding to the dynamic scheduling of the PDSCH adopts the manner of semi-static configuration plus DCI dynamic indication. In NR, the working mechanism of LTE is used to indicate the PUCCH for transmitting ACK/NACK information, that is, the PUCCH resource set is first configured by high-layer signaling, and then the DCI indicates one PUCCH in the resource set.

At most 4 PUCCH resource sets can be configured in NR, and the number range of Uplink Control Information (UCI) bit carried by each resource set is different. Each set may include the same or different PUCCH formats. The terminal determines one resource set from at most 4 resource sets according to the number of UCI bits to be transmitted. Then one PUCCH resource is determined from the set according to the indication of the DCI. FIG. 2 is a schematic diagram of a configuration of a PUCCH resource set according to an embodiment of the present application.

In addition, in the actual system, a large number of UEs need to feed back 1 or 2 bits of ACK/NACK information at Among them, $r_{PUCCH}$ is an index number of the PUCCH resource, $N_{CCE,p}$ is the number of CCEs in the control-resource set (CORESET), $n_{CCE,p}$ is the index number of the first CCE occupied by DCI, $R_{PUCCH}$ is the total number of PUCCH resources, $\Delta_{PRI}$ is the value indicated by the 3-bit indication information in the DCI.

For PUCCH sets 1, 2, and 3 (carrying more than 2 bits of UCI), up to 8 PUCCH resources can be configured by high-layer signaling. The terminal determines the used PUCCH resource according to the 3-bit indication information in the DCI, instead of using the implicit resource determination method.

The PUCCH resource used for unicast communication in NR is configured through the following Radio Resource Control (RRC) layer parameters, where the PUCCH resource set (PUCCH-ResourceSet) is used to configure the PUCCH resource set, one PUCCH resource set contains one or more PUCCH resources, one or more PUCCH resources are configured by the PUCCH resource set identifier (pucch-ResourceSetId), and the maximum payload size (maxPayloadSize) is used to configure the maximum number of bits allowed in the current PUCCH resource set.

The above pucch-ResourceSetId is associated with one PUCCH resource configuration (PUCCH-Resource), and in each PUCCH resource configuration, the starting physical resource block (PRB) (startingPRB) is used to indicate the starting PRB of the current PUCCH resource, the intra-slot frequency hopping (intraSlotFrequencyHopping) is used to indicate whether the current PUCCH resource activates the intra-slot frequency hopping, and the format is used to configure the PUCCH format supported in the current PUCCH resource.

```
PUCCH-ResourceSet ::=        SEQUENCE {
pucch-ResourceSetId             PUCCH-ResourceSetId,
resourceList                    SEQUENCE (SIZE (1..maxNrofPUCCH-ResourcesPerSet))
OF PUCCH-ResourceId,
```

-continued

```
maxPayloadSize            INTEGER (4..256)
OPTIONAL  -- Need R
}
PUCCH-ResourceSetId ::=   INTEGER (0..maxNrofPUCCH-ResourceSets-1)
PUCCH-Resource ::=          SEQUENCE {
pucch-ResourceId           PUCCH-ResourceId,
startingPRB                PRB-Id,
intraSlotFrequencyHopping  ENUMERATED { enabled }
OPTIONAL, -- Need R
secondHopPRB               PRB-Id
OPTIONAL, -- Need R
format                     CHOICE {
format0                       PUCCH-format0,
format1                       PUCCH-format1,
format2                       PUCCH-format2,
format3                       PUCCH-format3,
format4                       PUCCH-format4
}
}
```

If the PUCCH format supported by one PUCCH resource is PUCCH format 0, the RRC layer signaling includes the following parameters for configuring the initial cyclic shift (initialCyclicShift), the number of symbols (nrofSymbols), and the starting symbol (startingSymbolIndex) of PUCCH format 0. PUCCH format 0 occupies one PRB in the frequency domain and occupies one or two symbols in the time domain.

```
PUCCH-format0 ::=         SEQUENCE {
initialCyclicShift          INTEGER(0..11),
nrofSymbols                 INTEGER (1..2),
startingSymbolIndex         INTEGER(0..13)
}
```

In order to facilitate a better understanding of the embodiments of the present application, the feedback mechanism of the Hybrid Automatic Repeat-reQuest (HARQ) with two priorities in the unicast communication related to the present application is described.

In NR unicast communication, the base station can provide the terminal with two PUCCH configurations (PUCCH-config) for HARQ-ACK feedback of low priority (Priority 0) and high priority (Priority 1) respectively. Each PUCCH configuration (PUCCH-config) will provide one or more PUCCH resource sets (PUCCH-ResourceSet), and the configuration of PUCCH format 1, format 2, format 3 or format 4, etc. In the case of configuring two PUCCH-config, the terminal may feed back the HARQ-ACK bit with a Priority of 0 using the PUCCH resource configured in the first PUCCH-config, and feed back the HARQ-ACK bit with a Priority of 1 using the PUCCH resource configured in the second PUCCH-config.

For better understanding of the embodiments of the present application, the HARQ feedback mechanism in the multicast communication related to the present application is described.

In NR, the unicast of the RRC connection state has the feedback of Hybrid Automatic Repeat request Acknowledgement (HARQ-ACK) information. Currently, there is no feedback mechanism introduced in other multicast broadcast of systems, that is, UEs do not need to feed back with respect to receiving multicast or broadcast services. Some services in NR, for example, under V2X, industrial network Internet and other scenarios, need to be transmitted by multicast. Due to the increasing demand for reliability by these services, NR MBS introduces a feedback mechanism for multicast broadcast to ensure the reliability of service transmission, so that the network can determine whether to send retransmission according to the feedback information.

At present, there are two alternative HARQ-ACK feedback manners in the NR MBS system. The first manner is to feed back only NACK. The network sends MBS data. Among all the terminals that receive the MBS data, the terminal that correctly receives the data does not send feedback information, and the terminal that does not correctly receive the data sends NACK information to the network. In this manner, a plurality of terminals receiving the MBS data can send NACK feedback information through the shared uplink resource. The second manner is to feed back both ACK and NACK. When the UE successfully receives the MBS data sent by the base station, it feeds back ACK, otherwise it feeds back NACK.

The related art lacks an effective solution for how to select a PUCCH resource to transmit the HARQ feedback information when there are both HARQ feedback information for unicast and HARQ feedback information for MBS.

Based on the above problem, the present application proposes a scheme for determining a transmission resource of a target HARQ codebook, which can determine a PUCCH configuration for unicast and/or MBS for transmitting a HARQ codebook according to a corresponding relationship between a PUCCH configuration and a HARQ codebook determined based on priority information, so that the HARQ feedback information in the HARQ codebook can be effectively transmitted.

The technical solutions of the present application are described in detail below through specific embodiments.

FIG. 3 is a schematic flowchart of a method 300 of wireless communication according to an embodiment of the present application. As shown in FIG. 3, the method 300 may include at least part of the following contents.

In S310: the terminal device determines, according to a first corresponding relationship, a PUCCH configuration for transmitting at least one HARQ codebook, where the first corresponding relationship includes a corresponding relationship between the PUCCH configuration and the HARQ codebook determined based on priority information, and the HARQ codebook in the at least one HARQ codebook includes HARQ feedback information for unicast and/or HARQ feedback information for MBS.

It should be noted that, in the first corresponding relationship, each HARQ codebook has a corresponding PUCCH configuration, and the PUCCH configuration may be a PUCCH configuration for unicast or a PUCCH configuration for MBS, and the number of PUCCH configurations for unicast and the number of PUCCH for MBS are not limited in this embodiment.

Exemplarily, in the mode of feeding back only NACK information, the HARQ feedback information included in the HARQ codebook may be NACK information, and in the mode of feeding back both ACK information and NACK information, the HARQ feedback information included in the HARQ codebook may be ACK information or NACK information.

Optionally, the terminal device may generate the above-mentioned at least one HARQ codebook based on the indication of the network device.

In the embodiment of the present application, the terminal device may receive an RRC layer signaling to determine the PUCCH configuration, which may be indicated by the PDCCH, for example. The following describes the implementation manners of the present application under different PUCCH configurations through several embodiments.

In the first embodiment, the PUCCH configuration includes two PUCCH configurations for unicast and one PUCCH configuration for MBS.

It should be noted that the priority information of the two PUCCH configurations for unicast is different, for example, one PUCCH configuration has a high priority, and the other PUCCH configuration has a low priority. The PUCCH configuration for MBS may have high priority or low priority.

Exemplarily, the priority of the PUCCH configuration for unicast may be represented by p, when p=0, the priority is low, and when p=1, the priority is high. The priorities of the two PUCCH configurations for unicast are different, and are respectively 0 and 1. Hereinafter, the PUCCH with priority p is referred to as the first PUCCH for unicast, and the PUCCH with priority other than p is referred to as the second PUCCH configuration for unicast. The PUCCH configuration for MBS is the same as the following third PUCCH configuration for MBS, its priority may be represented by q, when q=0, the priority is low, and when q=1, the priority is high.

Optionally, the priority of the PUCCH configuration may be configured by the base station or defined by the standard.

In this embodiment, at least one HARQ codebook generated by the terminal device has at least three possible situations as follows.

In the first situation, the at least one HARQ codebook includes: a first HARQ codebook, a second HARQ codebook, and a third HARQ codebook. The first HARQ codebook includes HARQ feedback information of unicast, the second HARQ codebook includes HARQ feedback information of unicast, and the third HARQ codebook includes HARQ feedback information of MBS.

It should be noted that, after receiving the data transmitted by unicast or MBS, the terminal device generates HARQ feedback information for the unicast or MBS, where the unicast or MBS has priority information corresponding to the PUCCH. For example, the PDCCH indicates the PDSCH for transmitting unicast or MBS, and the PDCCH also indicates the PUCCH for the user to transmit HARQ feedback information for unicast or MBS. Therefore, the unicast or MBS is associated with the PUCCH, and the HARQ feedback information in the HARQ codebook and the corresponding PUCCH have corresponding priority information.

In the first situation of this embodiment, it is assumed that the unicast fed back by the first HARQ codebook is associated with the first PUCCH configuration for unicast, then the PUCCH configuration that has a first corresponding relationship with the first HARQ codebook is the first PUCCH configuration for unicast, the unicast fed back by the second HARQ codebook is associated with the second PUCCH configuration, then the PUCCH configuration that has a first corresponding relationship with the second HARQ codebook is the second PUCCH configuration for unicast, and the PUCCH configuration that has the first corresponding relationship with the third HARQ codebook is the third PUCCH configuration for the MBS.

In the embodiment of the present application, the terminal device determining the PUCCH configuration for transmitting at least one HARQ codebook based on the above-mentioned first corresponding relationship may include: the terminal device determining that the first PUCCH configuration for unicast is used for transmitting the first HARQ codebook, the second PUCCH configuration for unicast is used for transmitting the second HARQ codebook, and the third PUCCH configuration for MBS is used for transmitting the third HARQ codebook.

Further, the terminal device may transmit the first HARQ codebook on the PUCCH resource indicated by the first PUCCH configuration, transmit the second HARQ codebook on the PUCCH resource indicated by the second PUCCH configuration, and transmit the third HARQ codebook on the PUCCH resource indicated by the third PUCCH configuration.

In some embodiments, the PUCCH resource used for transmitting the first HARQ codebook or the PUCCH resource used for transmitting the second HARQ codebook may overlap in the time domain with the PUCCH resource used for transmitting the third HARQ codebook, respectively, where the first HARQ codebook or the second HARQ codebook is hereinafter referred to as a target HARQ codebook, and the following corresponding processing is performed for the PUCCH resource overlapping in the time domain to ensure effective transmission of the HARQ codebook.

Exemplarily, when the priority of the PUCCH resource used for transmitting the third HARQ codebook is different from the priority of the PUCCH resource used for transmitting the target HARQ codebook, the terminal device discards the HARQ codebook transmitted on the PUCCH resource with the lower priority.

Exemplarily, when the priority of the PUCCH resource used for transmitting the third HARQ codebook is the same as the priority of the PUCCH resource used for transmitting the target HARQ codebook, the terminal device abandons the transmission of the third HARQ codebook, or the terminal device combines the third HARQ codebook with the target HARQ codebook, and transmits the combined HARQ codebook on a target PUCCH resource, where the target PUCCH resource is indicated by the PDCCH associated with the last PDSCH fed back by the combined HARQ codebook.

In the second situation, the at least one HARQ codebook includes: a first HARQ codebook, a second HARQ codebook, and a third HARQ codebook. The first HARQ codebook includes HARQ feedback information of unicast, the second HARQ codebook includes feedback information of unicast and MBS, and the third HARQ codebook includes feedback information of MBS.

As explained in the first situation, the HARQ feedback information in the HARQ codebook and the corresponding PUCCH have corresponding priority information.

In the second situation of this embodiment, it is assumed that the unicast fed back by the first HARQ codebook is associated with the first PUCCH configuration for unicast, then the PUCCH configuration that has a first corresponding relationship with the first HARQ codebook is the first PUCCH configuration for unicast; the unicast and MBS fed back by the second HARQ codebook are associated with the first PUCCH configuration for unicast, then the PUCCH configuration that has a first corresponding relationship with the second HARQ codebook is the second PUCCH configuration for unicast; the MBS fed back by the third HARQ codebook is associated with the third PUCCH configuration for the MBS, and the PUCCH configuration that has a first corresponding relationship with the third HARQ codebook is the third PUCCH configuration for the MBS.

In the embodiment of the present application, the terminal device determining the PUCCH configuration for transmitting at least one HARQ codebook based on the above-mentioned first corresponding relationship may include: the terminal device determining that the first PUCCH configuration for unicast is used for transmitting the first HARQ codebook, the second PUCCH configuration for unicast is used for transmitting the second HARQ codebook, and the third PUCCH configuration for MBS is used for transmitting the third HARQ codebook.

Further, the terminal device transmits the first HARQ codebook on the PUCCH resource indicated by the first PUCCH configuration, transmits the second HARQ codebook on the PUCCH resource indicated by the second PUCCH configuration, and transmits the third HARQ codebook on the PUCCH resource indicated by the third PUCCH configuration.

In some embodiments, the PUCCH resource used for transmitting the first HARQ codebook or the PUCCH resource used for transmitting the second HARQ codebook may respectively overlap in the time domain with the PUCCH resource used for transmitting the third HARQ codebook, where the first HARQ codebook or the second HARQ codebook is hereinafter referred to as the target HARQ codebook. For the PUCCH resource that overlaps in the time domain, the terminal device may discard the HARQ codebook transmitted on the PUCCH resource with lower priority.

In some embodiments, the PUCCH resource used for transmitting the first HARQ codebook and the PUCCH resource used for transmitting the second HARQ codebook may overlap in the time domain, and for the PUCCH resource that overlaps in the time domain, the terminal device abandons transmission of the second HARQ codebook, or the terminal device combines the first HARQ codebook and the second HARQ codebook, and transmits the combined HARQ codebook on a target PUCCH resource, where the target PUCCH resource is indicated by the PDCCH associated with the last PDSCH that is fed back by the combined HARQ codebook.

In some embodiments, in the case that the PUCCH resource used for transmitting the target HARQ codebook and the PUCCH resource used for transmitting the third HARQ codebook overlap in the time domain, and the PUCCH resource used for transmitting the first HARQ codebook and the PUCCH resource used for transmitting the second HARQ codebook overlap in the time domain, the terminal device discards the HARQ transmitted on the PUCCH resource with low priority in the PUCCH resources corresponding to the target HARQ codebook and the third HARQ codebook, and abandons the transmission of the second HARQ codebook, or, while abandoning the HARQ transmitted on the PUCCH resource with low priority in the PUCCH resources corresponding to the target HARQ codebook and the third HARQ codebook, the terminal device combines the first HARQ codebook and the second HARQ codebook, and transmits the combined HARQ codebook on the target PUCCH resource. Generally speaking, if the terminal device abandons the transmission of the target HARQ codebook with low priority, the PUCCH resource used for transmitting the first HARQ codebook and the PUCCH resource used for transmitting the second HARQ codebook do not overlap in the time domain.

In the third situation, the at least one HARQ codebook includes: a first HARQ codebook and a second HARQ codebook. The first HARQ codebook includes HARQ feedback information of unicast and MBS, and the second HARQ codebook includes HARQ feedback information of unicast.

As explained in the first situation, the HARQ feedback information in the HARQ codebook and the corresponding PUCCH have corresponding priority information.

In the third situation of this embodiment, it is assumed that the first HARQ codebook and the first PUCCH configuration have corresponding priority information, for example, the priority is p, and at this time, the PUCCH that has the first corresponding relationship with the first HARQ codebook is the target PUCCH configuration. It should be noted that the target PUCCH is indicated within the PUCCH resource indicated by the first PUCCH configuration and the PUCCH resource indicated by the third PUCCH configuration by the PDCCH associated with the last PDSCH fed back by the first HARQ codebook. It should be understood that, the priority of the first PUCCH configuration is the same as that of the third PUCCH configuration; the second HARQ codebook and the second PUCCH configuration have corresponding priority information, for example, the priority is not p, then the PUCCH configuration that has the first corresponding relationship with the second HARQ codebook is the second PUCCH configuration for unicast.

In the embodiment of the present application, the terminal device determines the PUCCH configuration for transmitting at least one HARQ codebook based on the above-mentioned first corresponding relationship, which may include: the terminal device determining that the target PUCCH configuration is used for transmitting the first HARQ codebook, and the second PUCCH configuration for unicast is used for transmitting the second HARQ codebook.

Further, the terminal device may transmit the first HARQ codebook on the PUCCH resource indicated by the target PUCCH configuration, and transmit the second HARQ codebook on the PUCCH resource indicated by the second PUCCH configuration.

For example, the first HARQ codebook is sent on PUCCH 0, where PUCCH 0 is determined according to the PDCCH indication associated with the last PDSCH fed back in the first HARQ codebook. The second HARQ codebook is sent on the PUCCH resource indicated by the PUCCH configuration whose priority is not p, that is, the second PUCCH configuration. For example, when $p=0$, the HARQ feedback information of MBS is associated with the PUCCH resource of $p=0$. The terminal combines the HARQ feedback information of unicast associated with the PUCCH with priority of 0 and the HARQ feedback information of the MBS into one HARQ codebook and feeds it back on PUCCH 0, where PUCCH 0 is determined according to the PDCCH indication associated with the last PDSCH fed back in the HARQ codebook. The HARQ feedback information of unicast associated with the PUCCH with priority of 1 is combined to constitute another codebook, and it is sent on the PUCCH resource indicated by the PUCCH configuration with priority of 1.

In the second embodiment, the PUCCH configuration includes one PUCCH configuration for unicast and one PUCCH configuration for MBS.

It should be noted that the priority information of PUCCH configuration for unicast and the priority information of PUCCH configuration for MBS are different. For example, if the PUCCH configuration for unicast has high priority, the PUCCH configuration for MBS has low priority, and vice versa.

Exemplarily, the PUCCH configuration for unicast is the same as the first PUCCH configuration for unicast below, and its priority can be represented by pu, when pu=0, the priority is low, when pu=1, the priority is high, and the PUCCH configuration is the same as the second PUCCH configuration for the MBS below, and its priority can be represented by pm, when pm=0, the priority is low, when pm=1, the priority is high, and pu≠pm.

Optionally, the priority of the PUCCH configuration may be configured by the base station or defined by a standard.

In this embodiment, at least one HARQ codebook generated by the terminal device has at least three possible situations as follows.

In the first situation in the second embodiment, the at least one HARQ codebook includes: a first HARQ codebook and a second HARQ codebook. Both the first HARQ codebook and the second HARQ codebook include HARQ feedback information of unicast and MBS.

As described in the first situation in the first embodiment, the HARQ feedback information in the HARQ codebook and the corresponding PUCCH have corresponding priority information.

In the first situation of this embodiment, it is assumed that the unicast and MBS fed back by the first HARQ codebook are associated with the first PUCCH configuration for unicast, then the PUCCH configuration that has a first corresponding relationship with the first HARQ codebook is the first PUCCH configuration for unicast; the unicast and MBS corresponding to the second HARQ codebook are associated with the second PUCCH configuration for MBS, then the PUCCH configuration that has a first corresponding relationship with the second HARQ codebook is the second PUCCH configuration for MBS.

In the embodiment of the present application, the terminal device determining the PUCCH configuration for transmitting at least one HARQ codebook based on the above-mentioned first corresponding relationship may include: the terminal device determining that the first PUCCH configuration for unicast is used for transmitting the first HARQ codebook, and the second PUCCH configuration for MBS is used for transmitting the second HARQ codebook.

Further, the terminal device may transmit the first HARQ codebook on the PUCCH resource indicated by the first PUCCH configuration, and transmit the second HARQ codebook on the PUCCH resource indicated by the second PUCCH configuration.

In some embodiments, the PUCCH resource used for transmitting the first HARQ codebook and the PUCCH resource used for transmitting the second HARQ codebook may overlap in the time domain. For the PUCCH resource that overlaps in the time domain, the terminal device gives up the HARQ codebook transmitted on the PUCCH resource with low priority.

For the solution of the first situation in the foregoing second embodiment, the terminal device may send feedback information of unicast and MBS with different priorities on PUCCH resources with different priorities respectively.

In the second situation of the second embodiment, the at least one HARQ codebook includes: a first HARQ codebook and a second HARQ codebook. The first HARQ codebook includes HARQ feedback information of unicast, and the second HARQ codebook includes HARQ feedback information of unicast and MBS.

As described in the first situation in the first embodiment, the HARQ feedback information in the HARQ codebook and the corresponding PUCCH have corresponding priority information.

In the second situation of this embodiment, it is assumed that the unicast fed back by the first HARQ codebook is associated with the first PUCCH configuration for unicast, then the PUCCH configuration that has a first corresponding relationship with the first HARQ codebook is the first PUCCH configuration for unicast; the unicast and MBS corresponding to the second HARQ codebook are associated with the second PUCCH configuration for MBS, then the PUCCH configuration that has a first corresponding relationship with the second HARQ codebook is the second PUCCH configuration for MBS.

In the embodiment of the present application, the terminal device determining the PUCCH configuration for transmitting at least one HARQ codebook based on the above-mentioned first corresponding relationship may include: the terminal device determining that the first PUCCH configuration for unicast is used for transmitting the first HARQ codebook, the second PUCCH configuration for the MBS is used for transmitting the second HARQ codebook.

Further, the terminal device may transmit the first HARQ codebook on the PUCCH resource indicated by the first PUCCH configuration, and transmit the second HARQ codebook on the PUCCH resource indicated by the second PUCCH configuration.

In some embodiments, the PUCCH resource used for transmitting the first HARQ codebook and the PUCCH resource used for transmitting the second HARQ codebook may overlap in the time domain. For the PUCCH resource that overlaps in the time domain, the terminal device discards the HARQ codebook transmitted on the PUCCH resource with low priority.

For the solution of the second situation in the above second embodiment, the terminal device can send feedback information of unicast with different priorities on the PUCCH resources with different priorities, and only PUCCH configuration of one priority is supported for the feedback information of MBS, which is beneficial to reduce the complexity of the system.

In the third situation in the second embodiment, the at least one HARQ codebook includes: a first HARQ codebook and a second HARQ codebook. The first HARQ codebook includes feedback information of unicast, the second HARQ codebook includes feedback information of MBS, and the terminal device sends the first HARQ codebook on the PUCCH resource indicated by the first PUCCH configuration for unicast, and sends the second HARQ codebook on the PUCCH resource indicated by the second PUCCH configuration for MBS.

In the third embodiment, the PUCCH configuration includes two PUCCH configurations for unicast and two PUCCH configurations for MBS.

It should be noted that the priority information of the two PUCCH configurations for unicast is different, for example, one PUCCH configuration for unicast has a high priority, and the other PUCCH configuration for unicast has a low priority. The priority information of the two PUCCH configurations for MBS is also different, for example, one PUCCH configuration for MBS has a high priority, and the other PUCCH configuration for MBS has a low priority.

Exemplarily, the priority of the PUCCH configuration for unicast can be represented by pu, when pu=0, the priority is low, and when pu=1, the priority is high, and the priorities of the two PUCCH configurations for unicast are different, which are respectively 0 and 1. Hereinafter, the PUCCH with priority pu is referred to as the first PUCCH for unicast, and the PUCCH with priority that is not pu is referred to as the second PUCCH configuration for unicast. Similarly, the priority of the PUCCH configuration for MBS can be represented by pm, when pm=0, the priority is low, and when pm=1, the priority is high, and the two PUCCH configurations for MBS have different priorities, which are 0 and 1, respectively. Hereinafter, the PUCCH with the priority pm is referred to as the third PUCCH configuration for MBS, and the PUCCH whose priority is not pm is referred to as the fourth PUCCH configuration for MBS.

Optionally, the priority of the PUCCH configuration may be configured by the base station or defined by a standard.

In this embodiment, the at least one HARQ codebook includes: a first HARQ codebook, a second HARQ codebook, a third HARQ codebook, and a fourth HARQ codebook. Both the first HARQ codebook and the second HARQ codebook include HARQ feedback information of unicast, and both the third HARQ codebook and the fourth HARQ codebook include HARQ feedback information of MBS.

As explained in the first situation of the first embodiment, the HARQ feedback information in the HARQ codebook and the corresponding PUCCH have corresponding priority information.

In this embodiment, it is assumed that the unicast fed back by the first HARQ codebook is associated with the first PUCCH configuration for unicast, then the PUCCH configuration that has a first corresponding relationship with the first HARQ codebook is the first PUCCH configuration for unicast, correspondingly, the PUCCH configuration that has a first corresponding relationship with the second HARQ codebook is the second PUCCH configuration for unicast; it is assumed that the unicast fed back by the third HARQ codebook is related to the third PUCCH configuration for MBS, then the PUCCH configuration that has the first corresponding relationship with the third HARQ codebook is the third PUCCH configuration for MBS, and correspondingly, the PUCCH configuration that has the first corresponding relationship with the fourth HARQ codebook is the fourth PUCCH configuration for MBS.

Based on the above-mentioned first corresponding relationship, in the embodiments of the present application, the terminal device determining the PUCCH configuration for transmitting at least one HARQ codebook according to the first corresponding relationship may include: the terminal device determining that the first PUCCH configuration for unicast is used for transmitting the first HARQ codebook, the second PUCCH for unicast is used for transmitting the second HARQ codebook, the third PUCCH for the MBS is used for transmitting the third HARQ codebook, and the fourth PUCCH for MBS is used for transmitting the fourth HARQ codebook.

Further, in an implementation manner, the terminal device transmits the first HARQ codebook on the PUCCH resource indicated by the first PUCCH configuration, transmits the second HARQ codebook on the PUCCH resource indicated by the second PUCCH configuration, transmits the third HARQ codebook on the PUCCH resource indicated by the third PUCCH configuration, and transmits the fourth HARQ codebook on the PUCCH resource indicated by the fourth PUCCH configuration.

In another implementation manner, the terminal device transmits the first HARQ codebook and the third HARQ codebook on the PUCCH resource indicated by the first target PUCCH configuration, and transmits the second HARQ codebook and the fourth HARQ codebook on the PUCCH resource indicated by the second target PUCCH configuration.

The first target PUCCH configuration is indicated by the PDCCH associated with the last PDSCH fed back by the first HARQ codebook and the third HARQ codebook, and the second target PUCCH configuration is indicated by the physical downlink control channel (PDCCH) associated with the last PDSCH fed back by the second HARQ codebook and the fourth HARQ codebook.

In the fourth embodiment, the PUCCH configuration includes two PUCCH configurations for unicast.

It should be noted that the priority information of the two PUCCH configurations for unicast is different, for example, one PUCCH configuration has a high priority, and the other PUCCH configuration has a low priority.

Exemplarily, the priority of the PUCCH configuration for unicast may be represented by p, when p=0, the priority is low, and when p=1, the priority is high, and the priorities of the two PUCCH configurations for unicast are different, which are respectively: 0 and 1. Hereinafter, the PUCCH with priority p is referred to as the first PUCCH for unicast, and the PUCCH with priority other than p is referred to as the second PUCCH configuration for unicast.

Optionally, the priority of the PUCCH configuration may be configured by the base station or defined by a standard.

In this embodiment, the at least one HARQ codebook includes: a first HARQ codebook and a second HARQ codebook. Both the first HARQ codebook and the second HARQ codebook include HARQ feedback information of unicast and MBS.

As explained in the first situation of the first embodiment, the HARQ feedback information in the HARQ codebook and the corresponding PUCCH have corresponding priority information.

In this embodiment, it is assumed that the unicast and MBS fed back by the first HARQ codebook are associated with the first PUCCH configuration for unicast, then the PUCCH configuration that has a first corresponding relationship with the first HARQ codebook is the first PUCCH configuration for unicast, correspondingly, the unicast and MBS fed back by the second HARQ codebook are associated with the second PUCCH configuration for unicast, then the PUCCH configuration that has a first corresponding relationship with the second HARQ codebook is the second PUCCH configuration for unicast.

In this embodiment, the terminal device determining the PUCCH configuration for transmitting the at least one HARQ codebook based on the above-mentioned first corresponding relationship may include: the terminal device determining that the first PUCCH configuration for unicast is used for transmitting the first HARQ codebook, and the second PUCCH configuration for unicast is used for transmitting the second HARQ codebook.

Further, the terminal device transmits the first HARQ codebook on the PUCCH resource indicated by the first PUCCH configuration, and transmits the second HARQ codebook on the PUCCH resource indicated by the second PUCCH configuration.

In the fifth embodiment, the PUCCH configuration includes one PUCCH configuration for unicast.

In this embodiment, at least one HARQ codebook includes: a first HARQ codebook, where the first HARQ codebook includes HARQ feedback information of unicast and MBS. There is a first corresponding relationship between the first HARQ codebook and the PUCCH configuration for unicast, which is the same as the first PUCCH configuration for unicast hereinafter.

In this embodiment, the terminal device determining the PUCCH configuration for transmitting at least one HARQ codebook based on the above-mentioned first corresponding relationship may include: the terminal device determining that the first PUCCH configuration for unicast is used for transmitting the first HARQ codebook.

Further, the terminal device transmits the first HARQ codebook on the PUCCH resource indicated by the first PUCCH configuration for unicast.

Therefore, in the embodiments of the present application, the terminal device can determine the PUCCH configuration for transmitting the HARQ codebook for unicast and/or MBS according to the corresponding relationship between the PUCCH configuration and the HARQ codebook determined based on the priority information. That is, the HARQ feedback for unicast and the HARQ feedback for MBS can be transmitted based on PUCCH resources of different priorities, ensuring the reliability of transmission of the HARQ feedback for unicast and the HARQ feedback for MBS.

The method embodiment of the present application is described in detail above with reference to FIG. 3, and the apparatus embodiment of the present application is described in detail below with reference to FIGS. 4 to 7. It should be understood that the apparatus embodiment and method embodiment correspond to each other, and similar descriptions may be referred to the method embodiment.

FIG. 4 shows a schematic block diagram of a terminal device 400 according to an embodiment of the present application. As shown in FIG. 4, the terminal device 400 includes:

a processing unit 410, configured to determine a PUCCH configuration for transmitting at least one HARQ codebook according to a first corresponding relationship;

where the first corresponding relationship includes a corresponding relationship between a PUCCH configuration and a HARQ codebook determined based on priority information, and the HARQ codebook in the at least one HARQ codebook includes HARQ feedback information for unicast and/or HARQ feedback information of multicast broadcast service (MBS).

In some embodiments, the at least one HARQ codebook includes: a first HARQ codebook, a second HARQ codebook, and a third HARQ codebook; where the first HARQ codebook includes HARQ feedback information of unicast, the second HARQ codebook includes HARQ feedback information of unicast, and the third HARQ codebook includes HARQ feedback information of MBS.

In some embodiments, the processing unit 410 is specifically configured to:

determine that the first PUCCH configuration for unicast is used for transmitting the first HARQ codebook, the second PUCCH configuration for unicast is used for transmitting the second HARQ codebook, and the third PUCCH configuration for MBS is used for transmitting the third HARQ codebook HARQ codebook;

where a priority of the first PUCCH configuration is different from a priority of the second PUCCH configuration.

In some embodiments, the terminal device 400 further includes:

a communication unit 420, configured to transmit the first HARQ codebook on the PUCCH resource indicated by the first PUCCH configuration, transmit the second HARQ codebook on the PUCCH resource indicated by the second PUCCH configuration, and transmit the third HARQ codebook on the PUCCH resource indicated by the third PUCCH configuration.

In some embodiments, the communication unit 420 is specifically configured to:

in a case that the PUCCH resource used for transmitting a target HARQ codebook and the PUCCH resource used for transmitting the third HARQ codebook overlap in a time domain, and the PUCCH resource used for transmitting the third HARQ codebook and the PUCCH resource used for transmitting the target HARQ codebook have different priorities, discard the HARQ codebook transmitted on the PUCCH resource with a lower priority; or, in a case that the PUCCH resource used for transmitting the target HARQ codebook and the PUCCH resource used for transmitting the third HARQ codebook overlap in the time domain, and the PUCCH resource used for transmitting the third HARQ codebook and the PUCCH resource used for transmitting the target HARQ codebook have the same priority, abandon the transmission of the third HARQ codebook, or combine the third HARQ codebook and the target HARQ codebook, and transmit the combined HARQ codebook on a target PUCCH resource, where the target PUCCH resource is indicated by the physical downlink control channel (PDCCH) associated with the last physical downlink shared channel (PDSCH) fed back by the combined HARQ codebook;

where the target HARQ codebook is the first HARQ codebook or the second HARQ codebook.

In some embodiments, the at least one HARQ codebook includes: a first HARQ codebook, a second HARQ codebook, and a third HARQ codebook; where the first HARQ codebook includes HARQ feedback information of unicast, the second HARQ codebook includes feedback information of unicast and MBS, and the third HARQ codebook includes feedback information of MBS.

In some embodiments, the processing unit 410 is specifically configured to:

determine that the first PUCCH configuration for unicast is used for transmitting the first HARQ codebook, the second PUCCH configuration for unicast is used for transmitting the second HARQ codebook, and the third PUCCH configuration for MBS is used for transmitting the third HARQ codebook;

where a priority of the first PUCCH configuration is different from a priority of the second PUCCH configuration.

In some embodiments, the terminal device 400 further includes:

a communication unit 420, configured to transmit the first HARQ codebook on the PUCCH resource indicated by the first PUCCH configuration, transmit the second HARQ codebook on the PUCCH resource indicated by the second PUCCH configuration, and transmit the third HARQ codebook on the PUCCH resource indicated by the third PUCCH configuration.

In some embodiments, the communication unit 420 is specifically configured to:

in the case where the PUCCH resource used for transmitting the target HARQ codebook and the PUCCH resource used for transmitting the third HARQ codebook overlap in the time domain, discard the HARQ codebook transmitted on the PUCCH resource with a lower priority, where the target HARQ codebook is the first HARQ codebook or the second HARQ codebook; and/or, in the case where the PUCCH resource used for transmitting the first HARQ codebook and the PUCCH resource used for transmitting the second HARQ codebook overlap in the time domain, abandon the transmission of the second HARQ codebook, or combine the first HARQ codebook with the second HARQ codebook, and transmit the combined HARQ codebook on a target PUCCH resource, where the target PUCCH resource is indicated by the PDCCH associated with the last PDSCH fed back by the combined HARQ codebook.

In some embodiments, the at least one HARQ codebook includes: a first HARQ codebook and a second HARQ codebook; where the first HARQ codebook includes HARQ feedback information of unicast and MBS, and the second HARQ codebook includes HARQ feedback information of unicast.

In some embodiments, the processing unit 410 is specifically configured to:

determine that the target PUCCH configuration is used for transmitting the first HARQ codebook, and the second PUCCH configuration for unicast is used for transmitting the second HARQ codebook, the target PUCCH is indicated by the PDCCH associated with the last PDSCH fed back by the first HARQ codebook within the PUCCH resource indicated by the first PUCCH configuration and the PUCCH resource indicated by the third PUCCH configuration;

where the priority of the first PUCCH configuration is the same as the priority of the third PUCCH configuration.

In some embodiments, the terminal device 400 further includes:

a communication unit 420, configured to transmit the first HARQ codebook on the PUCCH resource indicated by the target PUCCH configuration, and transmit the second HARQ codebook on the PUCCH resource indicated by the second PUCCH configuration.

In some embodiments, the at least one HARQ codebook includes: a first HARQ codebook and a second HARQ codebook; where the first HARQ codebook and the second HARQ codebook both include HARQ feedback information of unicast and MBS.

In some embodiments, the at least one HARQ codebook includes: a first HARQ codebook and a second HARQ codebook; where the first HARQ codebook includes HARQ feedback information of unicast, and the second HARQ codebook includes HARQ feedback information of unicast and MBS.

In some embodiments, the processing unit 410 is specifically configured to:

determine that the first PUCCH configuration for unicast is used for transmitting the first HARQ codebook, and the second PUCCH configuration for MBS is used for transmitting the second HARQ codebook;

the priority of the first PUCCH configuration is different from the priority of the second PUCCH configuration.

In some embodiments, the terminal device 400 further includes:

a communication unit 420, configured to transmit the first HARQ codebook on the PUCCH resource indicated by the first PUCCH configuration, and transmit the second HARQ codebook on the PUCCH resource indicated by the second PUCCH configuration.

In some embodiments, the communication unit 420 is specifically configured to:

in the case that the PUCCH resource used for transmitting the first HARQ codebook and the PUCCH resource used for transmitting the second HARQ codebook overlap in the time domain, discard the HARQ codebook transmitted on the PUCCH resource with a lower priority.

In some embodiments, the at least one HARQ codebook includes: a first HARQ codebook, a second HARQ codebook, a third HARQ codebook, and a fourth HARQ codebook; where both the first HARQ codebook and the second HARQ codebook include HARQ feedback information of unicast, and both the third HARQ codebook and the fourth HARQ codebook include HARQ feedback information of MBS.

In some embodiments, the processing unit 410 is specifically configured to:

determine that the first PUCCH configuration for unicast is used for transmitting the first HARQ codebook, the second PUCCH configuration for unicast is used for transmitting the second HARQ codebook, the third PUCCH configuration for MBS is used for transmitting the third HARQ codebook, and the fourth PUCCH configuration for MBS is used for transmitting the fourth HARQ codebook;

where the priority of the first PUCCH configuration is different from the priority of the second PUCCH configuration, and the priority of the third PUCCH configuration is different from the priority of the fourth PUCCH configuration.

In some embodiments, the terminal device 400 further includes:

a communication unit 420, configured to transmit the first HARQ codebook on the PUCCH resource indicated by the first PUCCH configuration, transmit the second HARQ codebook on the PUCCH resource indicated by the second PUCCH configuration, transmit the third HARQ codebook on the PUCCH resource indicated by the third PUCCH configuration, and transmit the fourth HARQ codebook on the PUCCH resource indicated by the fourth PUCCH configuration.

In some embodiments, the terminal device 400 further includes:

a communication unit 420, configured to transmit the first HARQ codebook and the third HARQ codebook on the PUCCH resource indicated by a first target PUCCH configuration, and transmit the second HARQ codebook and the fourth HARQ codebook on the PUCCH resource indicated by a second target PUCCH configuration;

where the first target PUCCH configuration is indicated
    by the PDCCH associated with the last PDSCH fed
    back by the first HARQ codebook and the third HARQ
    codebook, and the second target PUCCH configuration
    is indicated by the physical downlink control channel
    (PDCCH) associated with the last physical downlink
    shared channel (PDSCH) fed back by the second
    HARQ codebook and the fourth HARQ codebook.

In some embodiments, the at least one HARQ codebook
includes: a first HARQ codebook and a second HARQ
codebook; where the first HARQ codebook and the second
HARQ codebook both include HARQ feedback information
of unicast and MBS.

In some embodiments, the processing unit 410 is specifi-
cally configured to:
    determine that the first PUCCH configuration for unicast
        is used for transmitting the first HARQ codebook, and
        the second PUCCH configuration for unicast is used for
        transmitting the second HARQ codebook;
    where the priority of the first PUCCH configuration is
        different from the priority of the second PUCCH con-
        figuration.

In some embodiments, the terminal device 400 further
includes:
    a communication unit 420, configured to transmit the first
        HARQ codebook on the PUCCH resource indicated by
        the first PUCCH configuration, and transmit the second
        HARQ codebook on the PUCCH resource indicated by
        the second PUCCH configuration.

In some embodiments, the at least one HARQ codebook
includes: a first HARQ codebook, and the first HARQ
codebook includes HARQ feedback information of unicast
and MBS.

In some embodiments, the processing unit 410 is specifi-
cally configured to:
    determine that the first PUCCH configuration for unicast
        is used for transmitting the first HARQ codebook.

It should be understood that the terminal device 400
according to the embodiments of the present application
may correspond to the terminal device in the method
embodiments of the present application, and the above-
mentioned and other operations and/or functions of indi-
vidual units in the terminal device 400 are respectively for
realizing the corresponding processes of the terminal device
in the method shown in FIG. 3, which are not elaborated
here for the sake of brevity.

FIG. 5 is a schematic structural diagram of a communi-
cation device 500 provided by an embodiment of the present
application. The communication device 500 shown in FIG.
5 includes a processor 510, and the processor 510 can call
and run a computer program from a memory, so as to
implement the method in the embodiments of the present
application.

In some embodiments, as shown in FIG. 5, the commu-
nication device 500 may also include a memory 520. The
processor 510 may call and run a computer program from
the memory 520 to implement the method in the embodi-
ments of the present application.

The memory 520 may be a separate device independent of
the processor 510, or may be integrated in the processor 510.

In some embodiments, as shown in FIG. 5, the commu-
nication device 500 may further include a transceiver 530,
and the processor 510 may control the transceiver 530 to
communicate with other devices, specifically, may send
information or data to other devices, or receive information
or data sent by other devices.

The transceiver 530 may include a transmitter and a
receiver. The transceiver 530 may further include antennas,
and the number of the antennas may be one or more.

In some embodiments, the communication device 500
may specifically be the terminal device of the embodiments
of the present application, and the communication device
500 may implement the corresponding processes imple-
mented by the terminal device in each method of the
embodiments of the present application, which are not
elaborated here for the sake of brevity.

Figure 6:
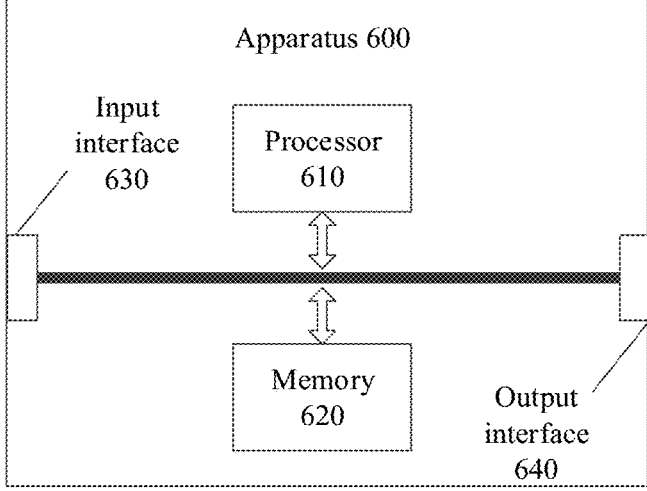
FIG. 6 is a schematic structural diagram of an apparatus according to an embodiment of the present application.

FIG. 6 is a schematic structural diagram of an apparatus
according to an embodiment of the present application. The
apparatus 600 shown in FIG. 6 includes a processor 610, and
the processor 610 can call and run a computer program from
a memory, so as to implement the method in the embodi-
ments of the present application.

In some embodiments, as shown in FIG. 6, the apparatus
600 may also include a memory 620. The processor 610 may
call and run a computer program from the memory 620 to
implement the methods in the embodiments of the present
application.

The memory 620 may be a separate device independent of
the processor 610, or may be integrated in the processor 610.

In some embodiments, the apparatus 600 may also
include an input interface 630. The processor 610 can
control the input interface 630 to communicate with other
devices or chips, and specifically, can obtain information or
data sent by other devices or chips.

In some embodiments, the apparatus 600 may also
include an output interface 640. The processor 610 can
control the output interface 640 to communicate with other
devices or chips, and specifically, can output information or
data to other devices or chips.

In some embodiments, the apparatus can be applied to the
terminal device in the embodiments of the present applica-
tion, and the apparatus can implement the corresponding
processes implemented by the terminal device in each
method of the embodiments of the present application,
which is not repeated here for brevity.

In some embodiments, the apparatus mentioned in the
embodiments of the present application may also be a chip.
For example, it may be a system-level chip, a system chip,
a chip system, or a system-on-chip.

Figure 7:
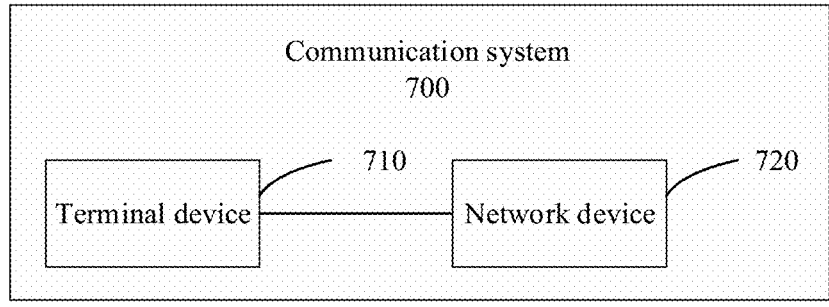
FIG. 7 is a schematic block diagram of a communication system provided by an embodiment of the present application.

FIG. 7 is a schematic block diagram of a communication
system 700 provided by an embodiment of the present
application. As shown in FIG. 7, the communication system
700 includes a terminal device 710 and a network device
720.

The terminal device 710 can be used to implement the
corresponding functions implemented by the terminal
device in the above method, and the network device 720 can
be used to implement the corresponding functions imple-
mented by the network device in the above method, which
is not repeated here for brevity.

It should be understood that the processor in the embodi-
ments of the present application may be an integrated circuit
chip, which has a signal processing capability. In the imple-
mentation process, each step of the above method embodi-
ments may be completed by a hardware integrated logic
circuit in a processor or an instruction in the form of
software. The above-mentioned processor can be a general-
purpose processor, a Digital Signal Processor (DSP), an
Application Specific Integrated Circuit (ASIC), a Field
Programmable Gate Array (FPGA) or other programmable
logic devices, discrete gates or transistor logic devices,
discrete hardware components. The methods, steps, and
logic block diagrams disclosed in the embodiments of the present application can be implemented or executed. The general-purpose processor may be a microprocessor or the processor may be any conventional processor or the like. The steps of the methods disclosed in conjunction with the embodiments of the present application may be directly embodied as executed by a hardware decoding processor, or executed by a combination of hardware and software modules in the decoding processor. The software module may be located in a random access memory, a flash memory, a read-only memory, a programmable read-only memory or an electrically erasable programmable memory, a register and other storage media mature in the art. The storage medium is located in the memory, and the processor reads the information in the memory, and completes the steps of the above method in combination with its hardware.

It can be understood that the memory in the embodiments of the present application may be a volatile memory or a non-volatile memory, or may include both volatile memory and non-volatile memory. The non-volatile memory may be a Read-Only Memory (ROM), a Programmable ROM (PROM), an Erasable PROM (EPROM), an Erasable PROM (EPROM), an Electrically EPROM (EEPROM) or a flash memory. The volatile memory may be a Random Access Memory (RAM), which acts as an external cache. By way of illustration and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of the systems and methods described herein is intended to include, but not be limited to, these and any other suitable types of memory.

It should be understood that the above memory is an example but not a limitative description, for example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) and so on. That is, the memory in the embodiments of the present application is intended to include but not limited to these and any other suitable types of memory.

Embodiments of the present application further provide a computer-readable storage medium for storing a computer program.

In some embodiments, the computer-readable storage medium may be applied to the network device in the embodiments of the present application, and the computer program causes the computer to execute the corresponding processes implemented by the network device in each method of the embodiments of the present application, which is not repeated here for brevity.

In some embodiments, the computer-readable storage medium may be applied to the terminal device in the embodiments of the present application, and the computer program enables the computer to execute the corresponding processes implemented by the terminal device in each method of the embodiments of the present application, which is not repeated here for brevity.

Embodiments of the present application also provide a computer program product, including computer program instructions.

In some embodiments, the computer program product may be applied to the network device in the embodiments of the present application, and the computer program instructions cause the computer to execute the corresponding processes implemented by the network device in each method of the embodiments of the present application, which is not repeated here for brevity.

In some embodiments, the computer program product may be applied to the terminal device in the embodiments of the present application, and the computer program instructions cause the computer to execute the corresponding processes implemented by the terminal device in each method of the embodiments of the present application, which is not repeated here for brevity.

The embodiments of the present application also provide a computer program.

In some embodiments, the computer program may be applied to the network device in the embodiments of the present application, and when the computer program runs on the computer, the computer executes the corresponding processes implemented by the network device in each method of the embodiments of the present application, which is not repeated here for brevity.

In some embodiments, the computer program may be applied to the terminal device in the embodiments of the present application, and when the computer program runs on the computer, the computer executes the corresponding processes implemented by the terminal device in each method of the embodiments of the present application, which is not repeated here for brevity.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Skilled artisans may implement the described functions using different methods for each particular application, but such implementations should not be considered beyond the scope of the present application.

Those skilled in the art can clearly understand that, for the convenience and brevity of description, the specific working process of the above-described systems, apparatuses and units may refer to the corresponding processes in the foregoing method embodiments, which will not be repeated here.

In the several embodiments provided in the present application, it should be understood that the disclosed system, apparatus and method may be implemented in other manners. For example, the apparatus embodiments described above are only illustrative. For example, the division of the units is only a logical function division. In actual implementation, there may be other division methods. For example, a plurality of units or components may be combined or may be integrated into another system, or some features may be ignored, or not implemented. On the other hand, the shown or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, may be located in one place, or may be distributed to a plurality of network units. Some or all of the units may be selected according to actual needs to achieve the purpose of the solution in this embodiment.

In addition, each functional unit in each embodiment of the present application may be integrated into one processing unit, or each unit may exist physically alone, or two or more units may be integrated into one unit.

The functions may be stored in a computer-readable storage medium if being implemented in the form of a software functional unit and sold or used as a stand-alone product. Based on such understanding, the essence or a part contributing to the related art of the technical solution of the embodiments of the present application or a part of the technical solution can be embodied in the form of software products, and the computer software product is stored in a storage medium, including several instructions for causing a computer device (which may be a personal computer, a server, or a network device, etc.) to execute all or part of the steps of the methods described in the embodiments of the present application. The aforementioned storage medium includes: a U disk, a removable hard disk, a Read-Only Memory (ROM), a Random Access Memory (RAM), a magnetic disk or an optical disk and other media that can store program codes.

The above are only specific embodiments of the present application, but the protection scope of the present application is not limited thereto. Changes or substitutions that can be easily thought of by the person skilled in the art within the technical scope disclosed in the present application should all be covered within the protection scope of the present application. Therefore, the protection scope of the embodiments of the present application should be subject to the protection scope of the claims.

What is claimed is:

1. A method of wireless communication, comprising:
   determining, by a terminal device, a physical uplink control channel (PUCCH) configuration for transmitting at least one hybrid automatic repeat request (HARQ) codebook according to a first corresponding relationship;
   wherein the first corresponding relationship comprises a corresponding relationship between the PUCCH configuration and the HARQ codebook determined based on priority information, and the HARQ codebook in the at least one HARQ codebook comprises HARQ feedback information for unicast and/or HARQ feedback information for multicast broadcast service (MBS);
   wherein the at least one HARQ codebook comprises: a first HARQ codebook, a second HARQ codebook and a third HARQ codebook; wherein the first HARQ codebook comprises HARQ feedback information of unicast, the second HARQ codebook comprises HARQ feedback information of unicast, and the third HARQ codebook comprises HARQ feedback information of MBS;
   wherein determining, by the terminal device, the PUCCH configuration for transmitting at least one HARQ codebook according to the first corresponding relationship, comprises:
   determining, by the terminal device, that a first PUCCH configuration for unicast is used for transmitting the first HARQ codebook, a second PUCCH configuration for unicast is used for transmitting the second HARQ codebook, and a third PUCCH configuration for MBS is used for transmitting the third HARQ codebook; and
   wherein a priority of the first PUCCH configuration is different from a priority of the second PUCCH configuration.

2. The method according to claim 1, wherein the method further comprises:
   transmitting the first HARQ codebook on a PUCCH resource indicated by the first PUCCH configuration, transmitting the second HARQ codebook on a PUCCH resource indicated by the second PUCCH configuration, and transmitting the third HARQ codebook on a PUCCH resource indicated by the third PUCCH configuration, by the terminal device.

3. The method according to claim 2, wherein transmitting the first HARQ codebook on the PUCCH resource indicated by the first PUCCH configuration, transmitting the second HARQ codebook on the PUCCH resource indicated by the second PUCCH configuration, and transmitting the third HARQ codebook on the PUCCH resource indicated by the third PUCCH configuration, by the terminal device, comprises:
   in a case that a PUCCH resource used for transmitting a target HARQ codebook and the PUCCH resource used for transmitting the third HARQ codebook overlap in a time domain, and priorities of the PUCCH resource used for transmitting the third HARQ codebook and the PUCCH resource used for transmitting the target HARQ codebook are different, discarding, by the terminal device, the HARQ codebook transmitted on the PUCCH resource with a lower priority; or
   in a case that the PUCCH resource used for transmitting the target HARQ codebook and the PUCCH resource used for transmitting the third HARQ codebook overlap in the time domain, and the priority of the PUCCH resource used for transmitting the third HARQ codebook is the same as that of the PUCCH resource used for transmitting the target HARQ codebook, abandoning, by the terminal device, transmission of the third HARQ codebook, or combining the third HARQ codebook with the target HARQ codebook and transmitting the combined HARQ codebook on a target PUCCH resource by the terminal device, wherein the target PUCCH resource is indicated by a physical downlink control channel (PDCCH) associated with a last physical downlink shared channel (PDSCH) fed back by the combined HARQ codebook;
   wherein the target HARQ codebook is the first HARQ codebook or the second HARQ codebook.

4. The method according to claim 1, wherein the at least one HARQ codebook comprises: a fourth HARQ codebook, a fifth HARQ codebook and a sixth HARQ codebook; wherein the fourth HARQ codebook comprises HARQ feedback information of unicast, the fifth HARQ codebook comprises feedback information of unicast and MBS, and the sixth HARQ codebook comprises feedback information of MBS.

5. The method according to claim 4, wherein determining, by the terminal device, the PUCCH configuration for transmitting at least one HARQ codebook according to the first corresponding relationship, comprises:
   determining, by the terminal device, that a fourth PUCCH configuration for unicast is used for transmitting the fourth HARQ codebook, a fifth PUCCH configuration for unicast is used for transmitting the fifth HARQ codebook, and a sixth PUCCH configuration for MBS is used for transmitting the sixth HARQ codebook;
   wherein a priority of the fourth PUCCH configuration is different from a priority of the fifth PUCCH configuration.

6. The method according to claim 5, wherein the method further comprises:
   transmitting the fourth HARQ codebook on a PUCCH resource indicated by the fourth PUCCH configuration, transmitting the fifth HARQ codebook on a PUCCH resource indicated by the fifth PUCCH configuration, and transmitting the sixth HARQ codebook on a PUCCH resource indicated by the sixth PUCCH configuration, by the terminal device.

7. The method according to claim 6, wherein transmitting the fourth HARQ codebook on the PUCCH resource indicated by the fourth PUCCH configuration, transmitting the fifth HARQ codebook on the PUCCH resource indicated by the fifth PUCCH configuration, and transmitting the sixth HARQ codebook on the PUCCH resource indicated by the sixth PUCCH configuration, by the terminal device, comprises:

in a case that a PUCCH resource used for transmitting a target HARQ codebook and the PUCCH resource used for transmitting the sixth HARQ codebook overlap in a time domain, discarding, by the terminal device, the HARQ codebook transmitted on the PUCCH resource with a lower priority, wherein the target HARQ codebook is the fourth HARQ codebook or the fifth HARQ codebook; and/or in a case that the PUCCH resource used for transmitting the fourth HARQ codebook and the PUCCH resource used for transmitting the fifth HARQ codebook overlap in the time domain, abandon, by the terminal device, transmission of the fifth HARQ codebook, or, combining the fourth HARQ codebook and the fifth HARQ codebook and transmitting the combined HARQ codebook on a target PUCCH resource by the terminal device, wherein the target PUCCH resource is indicated by a PDCCH associated with a last PDSCH fed back by the combined HARQ codebook.

8. A terminal device, comprising:

a processor and a memory, wherein the memory is configured to store a computer program, the processor is configured to call and run the computer program stored in the memory, and execute:

determining a PUCCH configuration for transmitting at least one HARQ codebook according to a first corresponding relationship;

wherein the first corresponding relationship comprises a corresponding relationship between the PUCCH configuration and the HARQ codebook determined based on priority information, and the HARQ codebook in the at least one HARQ codebook comprises HARQ feedback information for unicast and/or HARQ feedback information for multicast broadcast service (MBS);

wherein the at least one HARQ codebook comprises: a first HARQ codebook, a second HARQ codebook and a third HARQ codebook; wherein the first HARQ codebook comprises HARQ feedback information of unicast, the second HARQ codebook comprises HARQ feedback information of unicast, and the third HARQ codebook comprises HARQ feedback information of MBS;

wherein the processor is configured to:

determine that a first PUCCH configuration for unicast is used for transmitting the first HARQ codebook, a second PUCCH configuration for unicast is used for transmitting the second HARQ codebook, and a third PUCCH configuration for MBS is used for transmitting the third HARQ codebook; and wherein a priority of the first PUCCH configuration is different from a priority of the second PUCCH configuration.

9. The terminal device according to claim 8, wherein the at least one HARQ codebook comprises: a seventh HARQ codebook and an eighth HARQ codebook; wherein the seventh HARQ codebook comprises HARQ feedback information of unicast and MBS, and the eighth HARQ codebook comprises HARQ feedback information of unicast, wherein the processor is further configured to:

determine that a target PUCCH is used for transmitting the seventh HARQ codebook, and a eighth PUCCH for unicast is used for transmitting the eighth HARQ codebook, the target PUCCH is indicated by a PDCCH associated with a last PDSCH fed back by the seventh HARQ codebook within a PUCCH resource indicated by a seventh PUCCH configuration and a PUCCH resource indicated by a ninth PUCCH configuration;

wherein a priority of the seventh PUCCH configuration is the same as a priority of the ninth PUCCH configuration; and wherein the processor is configured to transmit the seventh HARQ codebook on a PUCCH resource indicated by the target PUCCH configuration, and transmit the eighth HARQ codebook on a PUCCH resource indicated by the eighth PUCCH configuration.

10. The terminal device according to claim 8, wherein the at least one HARQ codebook comprises: a ninth HARQ codebook and a tenth HARQ codebook; wherein both the ninth HARQ codebook and the tenth HARQ codebook comprise HARQ feedback information of unicast and MBS; or wherein the at least one HARQ codebook comprises: a ninth HARQ codebook and a tenth HARQ codebook; wherein the ninth HARQ codebook comprises HARQ feedback information of unicast, and the tenth HARQ codebook comprises HARQ feedback information of unicast and MBS.

11. The terminal device according to claim 10, wherein the processor is further configured to:

determine that a tenth PUCCH configuration for unicast is used for transmitting the ninth HARQ codebook, and an eleventh PUCCH configuration for MBS is used for transmitting the tenth HARQ codebook;

wherein a priority of the tenth PUCCH configuration is different from a priority of the eleventh PUCCH configuration, wherein the processor is further configured to transmit the ninth HARQ codebook on a PUCCH resource indicated by the tenth PUCCH configuration, and transmit the tenth HARQ codebook on a PUCCH resource indicated by the eleventh PUCCH configuration, wherein the processor is further configured to:

in a case that a PUCCH resource used for transmitting the ninth HARQ codebook and a PUCCH resource used for transmitting the tenth HARQ codebook overlap in a time domain, discarding the HARQ codebook transmitted on the PUCCH resource with a lower priority.

12. The terminal device according to claim 8, wherein the at least one HARQ codebook comprises: an eleventh HARQ codebook, a twelfth HARQ codebook, a thirteenth HARQ codebook and a fourteenth HARQ codebook; wherein both the eleventh HARQ codebook and the twelfth HARQ codebook comprises HARQ feedback information of unicast, and both the thirteenth HARQ codebook and the fourteenth HARQ codebook comprises HARQ feedback information of MBS.

13. The terminal device according to claim 12, wherein the processor is further configured to:

determine that a twelfth PUCCH configuration for unicast is used for transmitting the eleventh HARQ codebook, a thirteenth PUCCH configuration for unicast is used for transmitting the twelfth HARQ codebook, a fourteenth PUCCH configuration for MBS is used for transmitting the thirteenth HARQ codebook, and a fifteenth PUCCH configuration for the MBS is used for transmitting the fourteenth HARQ codebook;

wherein a priority of the twelfth PUCCH configuration is different from a priority of the thirteenth PUCCH configuration, and a priority of the fourteenth PUCCH configuration is different from a priority of the fifteenth PUCCH configuration.

14. The terminal device according to claim 13, wherein the processor is further configured to transmit the eleventh HARQ codebook on a PUCCH resource indicated by the twelfth PUCCH configuration, transmit the twelfth HARQ codebook on a PUCCH resource indicated by the thirteenth PUCCH configuration, transmit the thirteenth HARQ codebook on a PUCCH resource indicated by the fourteenth PUCCH configuration, and transmit the fourteenth HARQ codebook on a PUCCH resource indicated by the fifteenth PUCCH configuration.

15. The terminal device according to claim 14, wherein the processor is further configured to transmit the eleventh HARQ codebook and the thirteenth HARQ codebook on a PUCCH resource indicated by a first target PUCCH configuration, and transmit the twelfth HARQ codebook and the fourteenth HARQ codebook on a PUCCH resource indicated by a sixteenth target PUCCH configuration;

wherein the first target PUCCH configuration is indicated by a PDCCH associated with a last PDSCH fed back by the eleventh HARQ codebook and the thirteenth HARQ codebook, and the second target PUCCH configuration is indicated by the physical downlink control channel (PDCCH) associated with a last PDSCH fed back by the twelfth HARQ codebook and the fourteenth HARQ codebook.

16. The terminal device according to claim 8, wherein the at least one HARQ codebook comprises: a fifteenth HARQ codebook and a sixteenth HARQ codebook; wherein both the fifteenth HARQ codebook and the sixteenth HARQ codebook comprise HARQ feedback information of unicast and MBS;

wherein the processor is further configured to:

determine that a sixteenth PUCCH configuration for unicast is used for transmitting the fifteenth HARQ codebook, and a seventeenth PUCCH configuration for unicast is used for transmitting the sixteenth HARQ codebook;

wherein a priority of the sixteenth PUCCH configuration is different from a priority of the seventeenth PUCCH configuration; and wherein the processor is further configured to transmit the fifteenth HARQ codebook on a PUCCH resource indicated by the sixteenth PUCCH configuration, and transmit the sixteenth HARQ codebook on a PUCCH resource indicated by the seventeenth PUCCH configuration.

17. The terminal device according to claim 8, wherein the at least one HARQ codebook comprises: a seventeenth HARQ codebook, and the seventeenth HARQ codebook comprises HARQ feedback information of unicast and MBS.

18. The terminal device according to claim 17, wherein the processor is further configured to determine that an eighteenth PUCCH configuration for unicast is used for transmitting the seventeenth HARQ codebook.

* * * * *